United States Patent
Lee et al.

(10) Patent No.: US 6,741,851 B1
(45) Date of Patent: May 25, 2004

(54) METHOD FOR PROTECTING DATA STORED IN LOST MOBILE TERMINAL AND RECORDING MEDIUM THEREFOR

(75) Inventors: Tae-seung Lee, Seoul (KR); Sang-seo Lee, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 498 days.

(21) Appl. No.: 09/653,209

(22) Filed: Aug. 31, 2000

(30) Foreign Application Priority Data

Oct. 30, 1999 (KR) ........................................ 1999-47755

(51) Int. Cl.[7] ............................................... H04M 1/66
(52) U.S. Cl. ........................ 455/410; 455/411; 455/419
(58) Field of Search ................................. 455/410, 411, 455/418–420, 466, 414.1, 404.1

(56) References Cited

U.S. PATENT DOCUMENTS

| | | | | |
|---|---|---|---|---|
| 5,862,472 A | * | 1/1999 | Park ............................ | 455/411 |
| 5,898,783 A | * | 4/1999 | Rohrbach ..................... | 380/49 |
| 6,081,704 A | * | 6/2000 | Oshima ....................... | 455/410 |
| 6,112,078 A | * | 8/2000 | Sormunen .................... | 455/411 |
| 6,285,870 B1 | * | 9/2001 | Lorieau ....................... | 455/411 |
| 6,343,214 B1 | * | 1/2002 | Holmes ....................... | 455/411 |
| 6,385,316 B1 | * | 5/2002 | Rose ............................ | 380/28 |
| 6,393,305 B1 | * | 5/2002 | Ulvinen ...................... | 455/563 |
| 6,415,144 B1 | * | 7/2002 | Findikli ....................... | 455/419 |
| 6,583,714 B1 | * | 6/2003 | Gabou ......................... | 340/5.54 |

* cited by examiner

*Primary Examiner*—William Trost
*Assistant Examiner*—Brandon J Miller
(74) *Attorney, Agent, or Firm*—Sughrue Mion, PLLC

(57) ABSTRACT

A method for protecting data stored in a lost mobile terminal and a recording medium for storing the data are provided. In the method, a user who has lost the mobile terminal transmits protection control information to the lost mobile terminal, using a communication apparatus. The lost mobile terminal receives and discriminates the protection control information. User identifying information, which is included in the protection control information, is compared with information which is previously stored in the lost mobile terminal. When the user identifying information is identical to the information previously stored in the lost mobile terminal, the data which is stored in the lost mobile terminal is processed according to the user's data protection request which is included in the protection control information.

18 Claims, 6 Drawing Sheets

METHOD FOR PROTECTING DATA STORED IN LOST MOBILE TERMINAL AND RECORDING MEDIUM THEREFOR

BACKGROUND OF THE INVENTION

1. Field of the Invention

The present invention relates to mobile communication, and more particularly, to a method for protecting data stored in a lost mobile terminal and a recording medium for storing data.

2. Description of the Related Art

Recently, widely commercialized portable telephones have been provided with various functions such as an electronic organizer function in addition to a basic communication function. To use the electronic organizer function, a user stores various data, for example, telephone numbers, encrypted information, card numbers, text, voice information and multimedia information, in a portable telephone.

There may be important information which must not be revealed to others, among data stored in a portable telephone. If the user has not password-protected the data to lock the data when storing the data in the portable telephone, in a case where the user loses the portable telephone, the data stored in the portable telephone 320 may be compromised.

According to conventional technologies, when a user loses their portable telephone, the user can report the loss to a network operator 310 which supports communication service and request the operator to interrupt and cancel the communication service with respect to the lost portable telephone. However, data stored in the portable telephone 320 cannot be protected. Consequently, there is a high possibility that the data, which is stored in the portable telephone, can be revealed to a person who finds the portable telephone.

SUMMARY OF THE INVENTION

To solve the above problems, it is an objective of the present invention to provide a method for protecting data stored in a lost mobile terminal, in which, when an owner loses their mobile terminal, the owner 300 of the lost mobile terminal can directly make data, which is stored in the lost mobile terminal, unreadable or remove the data using protection control information.

It is another objective of the present invention to provide a method for protecting data stored in a lost mobile terminal, in which, when an owner loses his/her mobile terminal, through a base station, the owner 300 of the lost mobile terminal can make data, which is stored in the lost mobile terminal, unreadable or remove the data using protection control information.

It is yet another objective of the present invention to provide a recording medium for storing program codes for a data protection method which is performed in a mobile terminal.

It is still yet another objective of the present invention to provide a recording medium for storing program codes for a data protection method which is supported by a base station.

Accordingly, to achieve the first and/or other objectives in one embodiment, there is provided a method for protecting data which is stored in a lost mobile terminal. The method includes the steps of (a) transmitting protection control information, which is provided by a user who has lost the mobile terminal, to the lost mobile terminal using a communication apparatus chosen arbitrarily by the user, (b) receiving and discriminating the protection control information in the lost mobile terminal, (c) comparing user identifying information included in the protection control information with information which is previously stored in the lost mobile terminal, and (d) processing the data which is stored in the lost mobile terminal according to a data protection request of the user, the data protection request included in the protection control information, when the user identifying information is identical to the information previously stored in the lost mobile terminal.

To achieve the second and/or other objectives in another embodiment, there is provided a method for protecting data which is stored in a lost mobile terminal. The method includes the steps of (a) requesting data protection service of a base station using a communication apparatus chosen arbitrarily by a user who has lost the mobile terminal, (b) authenticating the user's identity in the base station, (c) transmitting protection control information, which is provided by the user, via the base station to the lost mobile terminal if the user's identity is authenticated, (d) receiving and discriminating the protection control information in the lost mobile terminal, (e) comparing user identifying information included in the protection control information with information which is previously stored in the lost mobile terminal, and (f) processing the data which is stored in the lost mobile terminal according to the data protection request of the user, the data protection request included in the protection control information, when the user identifying information is identical to the information previously stored in the lost mobile terminal.

To achieve the third and/or other objectives, there is provided a recording medium for storing a data protection method, which is performed by a mobile terminal, in the form of program codes which can be executed in a computer. The program codes are made to execute the steps of discriminating protection control information, which is provided by a user and a base station for data protection, from a received short message; comparing user identifying information and, if necessary, network identifying information, included in the protection control information with information which is previously stored in the recording medium to correspond to the protection control information; and processing the data stored in the mobile terminal according to the user's data protection request included in the protection control information when the protection control information is identical to the previously stored information.

To achieve the fourth and/or other objectives, there is provided a recording medium for storing a data protection method, which is supported by a base station to be performed on data, which is stored in a lost mobile terminal, in the form of program codes which can be executed in a computer. The program codes are made to execute the steps of authenticating the identity of a user when the user requests data protection service; receiving protection control information which is provided by the user for protecting the data, which is stored in the lost mobile terminal, if the identity of the user is authenticated; adding protection control information provided by a base station when necessary, if the protection control information received from the user is encrypted text; and transmitting the protection control information to the lost mobile terminal using short message service.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

A method for protecting data stored in a lost mobile terminal and a recording medium for storing the data according to the present invention, will now be described more fully with reference to the accompanying drawings, in which preferred embodiments of the invention are shown. The data protection method of the present invention includes a step of transmitting protection control information (PCI) from a user to a mobile station or from a user via a base station to a mobile station, and a post treatment step performed after the PCI reaches the mobile station. Here, the mobile station is referred to as a mobile terminal or a portable terminal. In the description of the present invention which will be set forth, a portable telephone is used as an example of a mobile station.

Figure 1:
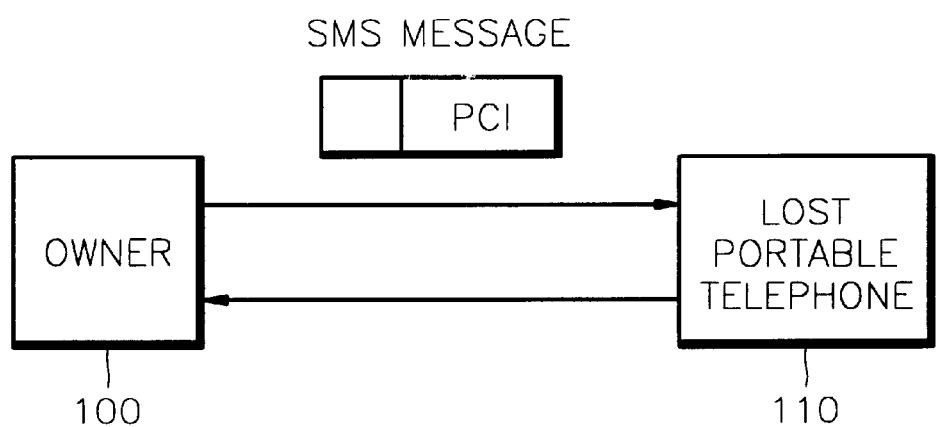
FIG. 1 is a conceptual block diagram showing an example of a portable telephone service system to which the present invention is applied.

FIG. 1 shows the interrelation between a user 100 (hereinafter, referred to as owner), who has lost their portable telephone, and a lost portable telephone 110. Referring to FIG. 1, in a preferred embodiment of the present invention, the owner 100, after recognizing that they have lost their portable telephone, directly transmits PCI for data protection to the lost portable telephone 110 using a computer or other device, for example, another portable telephone. The lost portable telephone 110 receives the PCI and checks user identifying information (representatively, a password) embedded in the PCI. Then, the lost portable telephone 110 performs suitable service according to a user's data protection request with respect to data, which is stored in the lost portable telephone 110, the data protection request which is embedded in the PCI.

The PCI is information which is defined for the purpose of protecting data which is stored in a lost portable telephone. The PCI includes at least user identifying information for allowing a portable telephone to authenticate an original user, and a user's data protection request which a user demands of a portable telephone. In the preferred embodiment, the PCI is provided by the owner and known only to the owner. The PCI is preferably transmitted using short message service (SMS) which is widely utilized at present in mobile communications systems.

Figure 2:
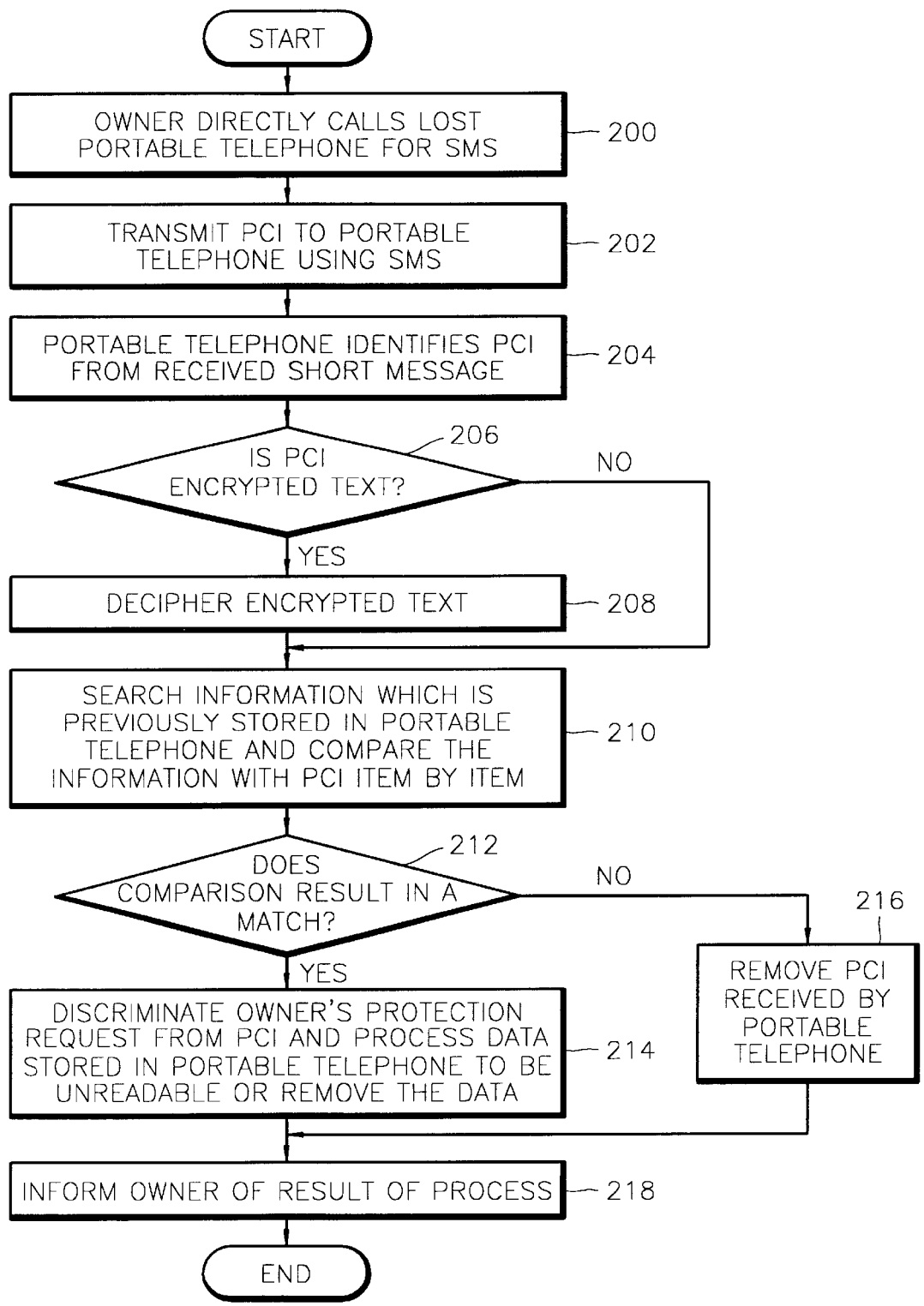
FIG. 2 is a flow chart for explaining a data protection method according to an embodiment of the present invention.

FIG. 2 is a flow chart for explaining a data protection method according to an embodiment of the present invention. Referring to FIG. 2, the operation between the owner 100 and the lost portable telephone 110 depicted in FIG. 1 will be set forth in detail.

Initially, the owner 100 directly calls a portable telephone for SMS in step 200. The owner 100 transmits the PCI, which is known only to the owner 100, to the lost portable telephone 110 using SMS in step 202. The PCI may be plain text or encrypted text which is encrypted using a public key. In the case of using the encrypted text, a private key is embedded in the lost portable telephone and the owner must know the public key corresponding to the private key.

After the step 202, when the lost portable telephone 110 receives a short message from the owner 100, the lost portable telephone 110 discriminates the PCI from the received short message in step 204. When a code for identifying PCI, that is, a PCI ID, is found in an SMS data area not in an SMS header in the short message, the lost portable telephone 110 proceeds to a module for processing the PCI. If the PCI ID is not found, the lost portable telephone 110 progresses to a conventional SMS processing module. Accordingly, the module for processing PCI must be added to a conventional portable telephone, and a controller such as a microcomputer must be implemented to be capable of processing the PCI.

If the PCI is identified in the step 204, it is determined whether the identified PCI is encrypted text in step 206. If the PCI is encrypted text, the encrypted text is decrypted into plain text using a private key which is embedded in the portable telephone 110 in step 208. The PCI in the form of plain text includes at least protection request data (or protection/cancel request data) and user identifying information (for example, a password, a finger print, voice or their combination) which only the owner 100 knows.

Next, information, which is previously stored in the lost portable telephone 110, is searched and the searched information is compared with the PCI item by item in step 210. Comparison between items is performed in units of data when there are a plurality of data which are used for the lost portable telephone 110 to authenticate the original owner 100.

It is determined whether the comparison results in a match in step 212. If the comparison results in a match, the owner's data protection request is identified from the PCI and data, which is stored in the lost portable telephone 110, is processed according to the request in step 214. On the other hand, if the comparison does not result in a match, the PCI which is received by the portable telephone 110 is removed in step 216.

The owner's data protection request is includes an unreadable data request for making stored data unreadable and/or a data removal request for deleting stored data. According to the unreadable data request, for example, stored data is hashed and mapped onto null characters, or the input/output function of a portable telephone is made to be inoperable. According to the data removal request, for example, stored data is completely removed, or the same process as that according to the unreadable data request is performed when data is stored in a read-only storage medium such as ROM is processed.

Additionally, a protection release request is established taking into account a case in which the owner 100 finds the lost portable telephone after the owner 100 has issued an unreadable data request to the lost portable telephone 110. Instead of protection request data, protection release request data is simply embedded into PCI. According to the protection release request, the portable telephone 110 changes the mode from a data unreadable state into a data readable state.

Finally, after the step 214 or the step 216, the owner 100 is informed of the result of a process performed by the portable telephone 110 in a case where the owner's request is permitted or not permitted, in step 218. For example, after a predetermined period of time, the owner 100 can be immediately informed of the result of the process, or the owner can check the result later.

Figure 3:
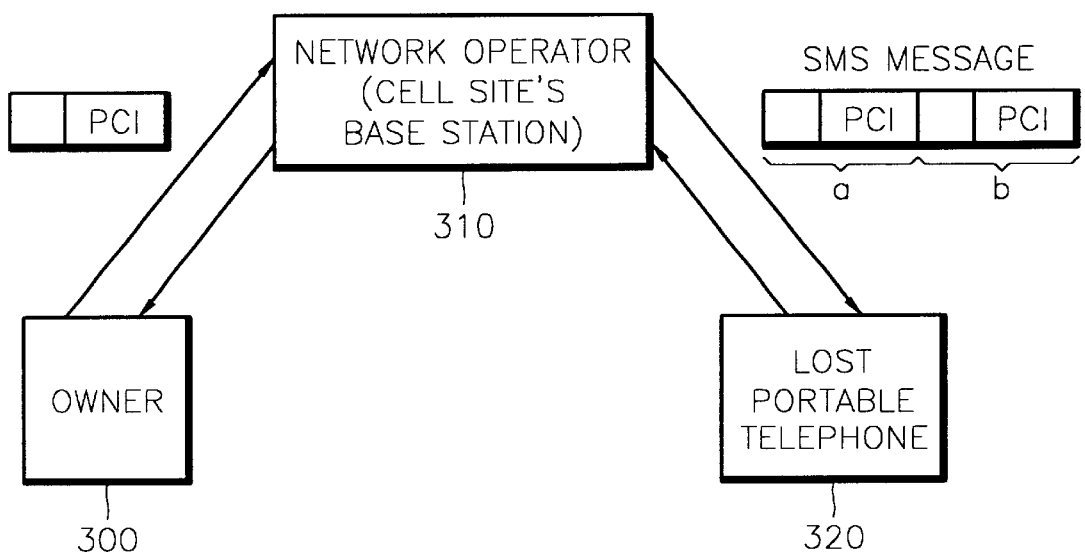
FIG. 3 is a conceptual block diagram showing another example of a portable telephone service system to which the present invention is applied.

FIG. 3 is a conceptual block diagram showing another example of a portable telephone service system to which the present invention is applied. FIG. 3 shows the interrelation among an owner 300, a network operator 310 and a portable telephone 320.

Referring to FIG. 3, in a preferred embodiment of the present invention, the owner 300, after recognizing that the portable telephone 110 has been lost, calls a base station, specifically, the network operator 310 for related services, using a computer or other device, for example, another portable telephone. The PCI for protecting data is transmitted to the lost portable telephone 320 through the network operator 310.

The lost portable telephone 320 receives the PCI from the network operator 310 and checks user identifying information (representatively, a password) embedded in the PCI. Then, the lost portable telephone 320 performs a suitable service according to the user's data protection request with respect to data, which is stored in the lost portable telephone 310, the data protection request which is embedded in the PCI.

In the preferred embodiment, PCI is provided by the owner and a network operator when necessary. The SMS message includes information (b), which only the network operator knows, in addition to information (a) which only the owner knows.

Figure 4A:
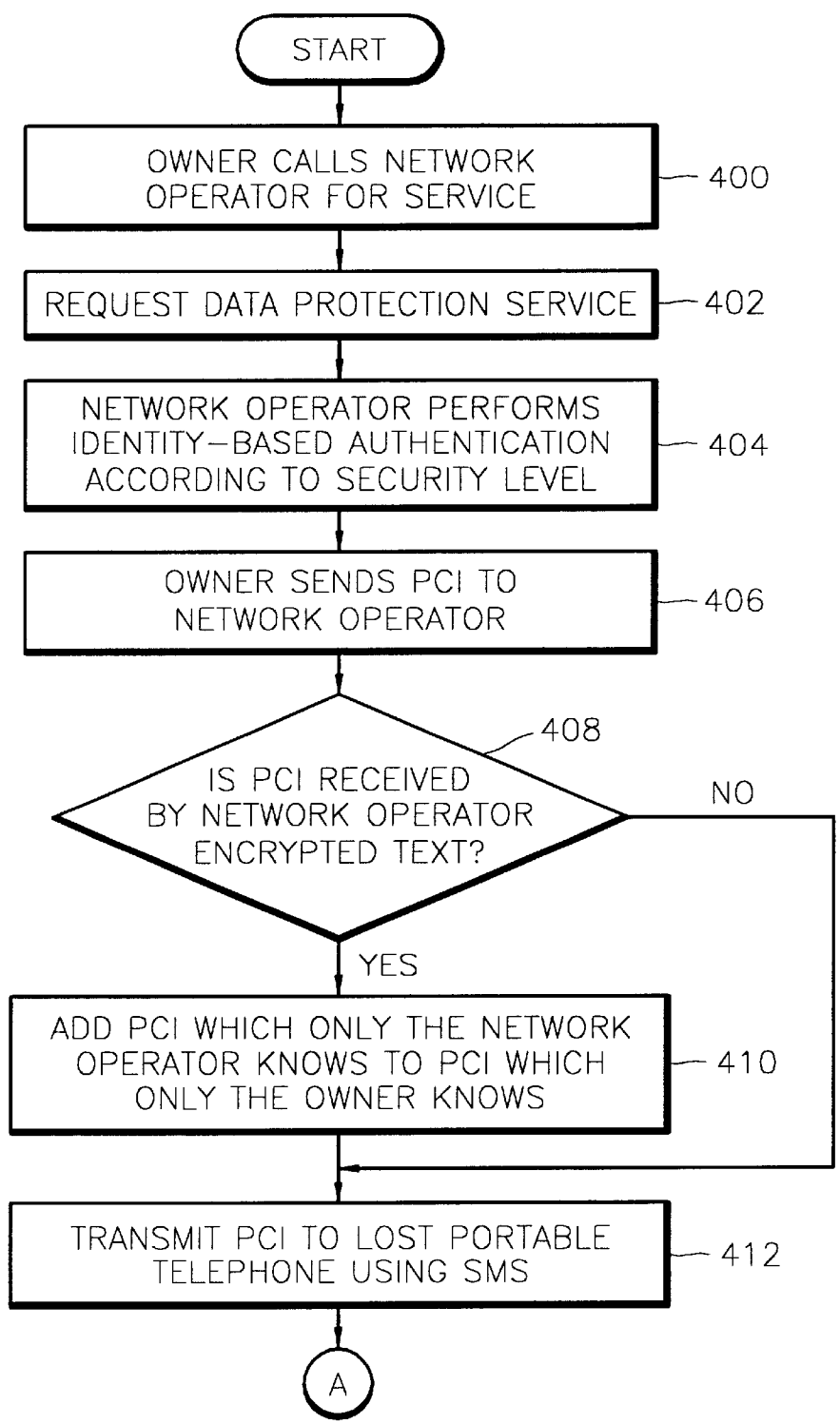
FIGS. 4A and 4B are flow charts for explaining a data protection method according to another embodiment of the present invention.
Figure 4B:
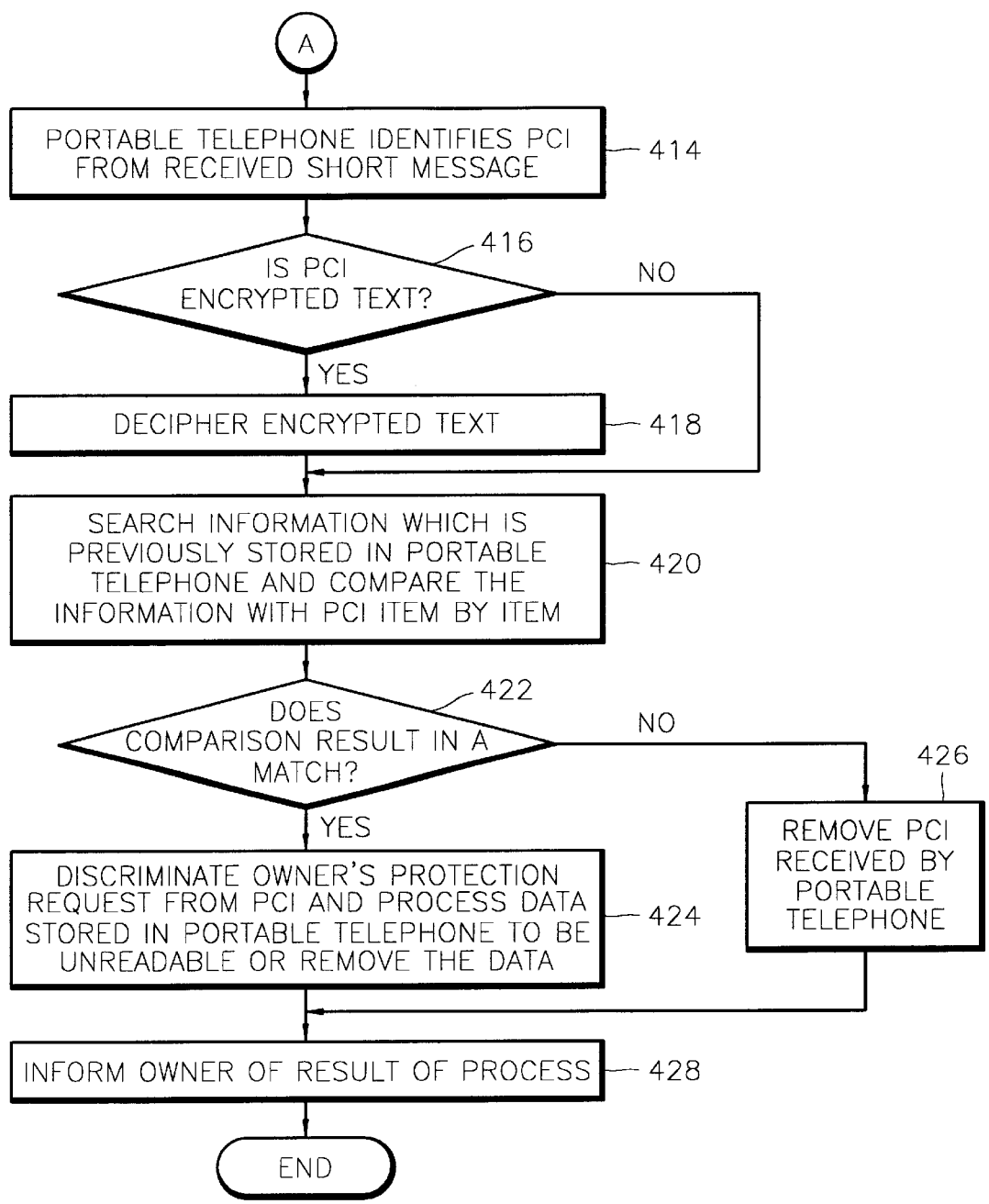

FIGS. 4A and 4B are flow charts for explaining a data protection method according to another embodiment of the present invention. Referring to FIGS. 4A and 4B, the operation among the owner 300, network operator 310 and the lost portable telephone 320 depicted in FIG. 3 will be set forth in detail.

Initially, the owner 300 directly calls a network operator 310 for service in step 400. The owner 300 requests a data protection service among services provided by the network operator 310 in step 402. In other words, the owner 300 does not request SMS but a data protection (or protection/protection release) service.

Next, the network operator 310 performs identity-based authentication to determine whether the owner 300 requesting the service is the original owner of the lost portable telephone 320 in step 404. Specifically, the identity-based authentication is performed according to security levels. A security level is selected based on a prearranged agreement between the original owner of the lost portable telephone 320 and the network operator, or on the actual environment of application. The following description concerns some examples of the identity-based authentication method according to security levels.

When the security level is lowest, the password, which is received when the owner 300 requests the service, is used. It would be noted that the password is for requesting the protection service or the protection release service and may not be the same as the password for user identification, which is embedded into the lost portable telephone. When the security level is medium, the owner's address, the owner's account number and/or identification number are used in addition to the lowest security level. When the security level is highest, a certificate is used in addition to the two previous security levels.

For example, if the network operator 310 intends to perform the identity-based authentication according to the highest level, the network operator 310 requests the owner 300 to transmit a certificate including the owner's public key and encrypted text obtained by encrypting data corresponding to the first two security levels using the owner's private key. In a case where the network operator 310 has the owner's certificate, the owner 300 may not send the certificate to the network operator.

The network operator 310 checks whether the owner's certificate is valid or expired, and decrypts the encrypted text using the owner's public key. After decrypting the encrypted text, the network operator 310 searches a network operator 310 database for owner information and compares the searched owner information with the owner's password and address and/or account number to authenticate the owner's identity.

If the owner's identity is authenticated in the step 404, the owner 300 sends PCI, which only the owner 300 knows, to the network operator 310 in step 406. The PCI may be plain text or encrypted text which is encrypted using a public key. In the case of using encrypted text, a private key is embedded in the lost portable telephone 320 and the owner 300 must know the public key corresponding to the private key.

After the step 406, it is determined whether the PCI received by the network operator 310 is encrypted text in step 408. If the PCI is encrypted text, the network operator 310 cannot decipher the encrypted text as long as the network operator 310 does not know the private key which is embedded in the lost portable telephone. In the case where the network operator 310 cannot decipher the encrypted text, the network operator 310 adds PCI, which only the network operator 310 knows, to the encrypted text, which is received from the owner 300, in step 410. The PCI provided by the network operator 310 may also be plain text or encrypted text.

Subsequently, the network operator 310 transmits the PCI, which has undergone the step 410, or the PCI, which has not undergone the step 410, to the lost portable telephone 320 using SMS in step 412.

Once the lost portable telephone 320 receives a short message from the network operator, the lost portable telephone 320 discriminates the PCI from the received short message in step 414. The operation for discriminating the PCI and subsequent operations are actually the same as those described in the first preferred embodiment.

However, after discriminating the PCI, it is determined whether the PCI received from the network operator 310 is encrypted text in step 416. If the PCI is encrypted text, the PCI, which is provided by the owner 300 and the network operator, is all decrypted in step 418.

Next, information, which is previously stored in the lost portable telephone, is searched and the searched information is compared with the PCI item by item in step 420. It is determined whether the comparison results in a match in step 422. If there is a match, the owner's data protection request is identified from the PCI, and data, which is stored in the lost portable telephone, is processed to be unreadable or removed according to the request in step 424. On the other hand, if there is not a match, the PCI which is received by the portable telephone 320 is removed in step 426.

Finally, after the step 424 or the step 426, the network operator 310 is informed of the result of a process performed by the portable telephone 320 in the case where the owner's request is permitted or not permitted, in step 428. Consequently, the owner 300 is informed of the result of the process.

Figure 5A:
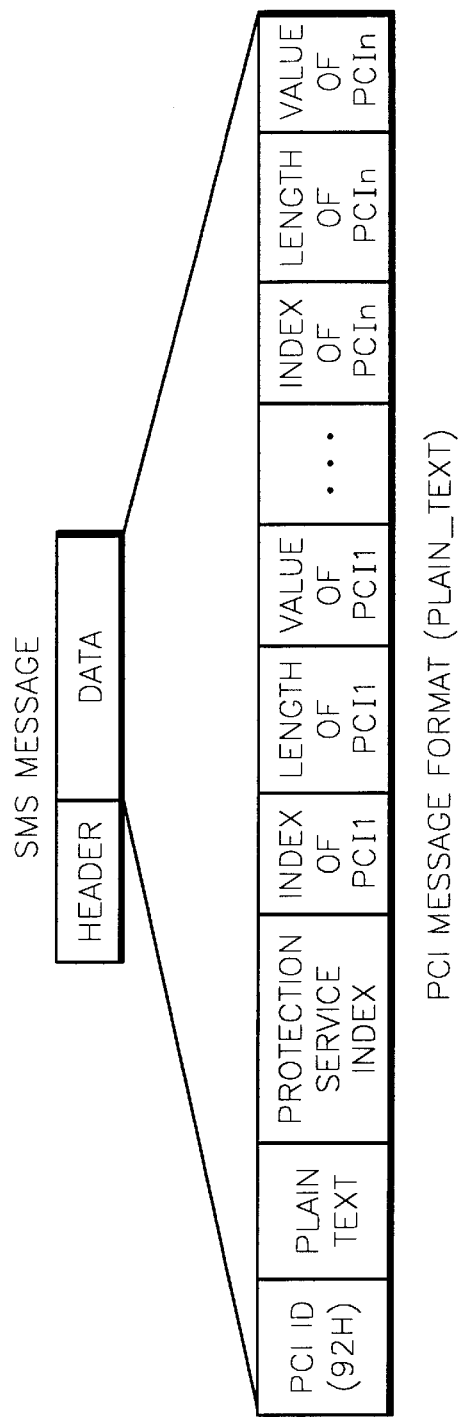
FIGS. 5A and 5B show examples of data formats of protection control information which is used in the present invention, respectively.
Figure 5B:
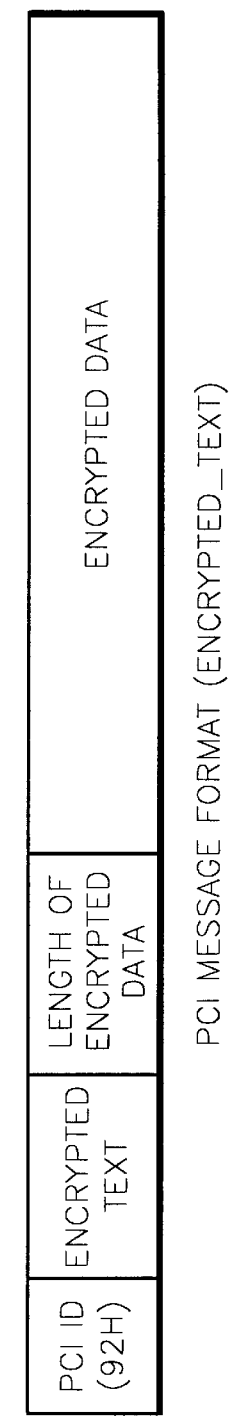

FIGS. 5A and 5B show examples of data formats of protection control information which is used in the present invention, respectively. As described above, PCI is preferably transmitted using SMS which is widely used in present.

Referring to FIG. 5A, a short message is largely divided into a header and a data area. PCI is embedded into the data area. Preferably, a PCI message format includes: 1) a PCI identifier (PCI ID); 2) an area for discriminating plain text from encrypted text; 3) a protection service index which defines the type of protection request; and 4) PCI items (index of PCI 1, length of PCI 1, value of PCI 1, . . . , index of PCI n, length of PCI n and value of PCI n) which are to be compared with information which is previously stored in the portable telephone.

For example, a PCI ID is composed of 8 bytes. When the first 8 bytes of the data area in a short message is 92H, the 8-byte indicates that the short message is a PCI message. If the next one byte of an area for discriminating a plain text from a encrypted text is 0, the byte indicates that the PCI message is a plain text. Alternatively, if the next byte is 1, the byte indicates that the PCI message is encrypted text. When a lost portable telephone 320 identifies the PCI ID and confirms that the PCI message is encrypted text, the lost portable telephone 320 decrypts the encrypted text corresponding to the length (2 bytes) of data of the short message.

If the byte of a protection service index defining the type of protection request is 0, the byte indicates that the request is an unreadable data request. If the byte of the protection service index is 1, the byte indicates that the request is a data removal request. If the byte of the protection service index is 2, the byte indicates that the request is a protection release request. If the byte of a PCI index indicating the type of user identifying information is 0, the byte indicates that the user identifying information type is a password. If the byte of the PCI index is 1, the byte indicates that the user identifying information type is the user's fingerprint. If the byte of the PCI index is 2, the byte indicates that the user identifying information type is the user's voice. Areas succeeding each PCI index item indicate the length and value of user identifying information corresponding to each PCI index.

When an area for discriminating plain text from encrypted text is provided by a byte indicating plain text, PCI is formatted as shown in FIG. 5A. When the area for discriminating plain text from encrypted text is provided by a byte indicating encrypted text, in a PCI message format, as shown in FIG. 5B, an area indicating the length of encrypted data and an area of the encrypted data are added next to the area indicating the encrypted text.

In relation to the above embodiments of the present invention, a data protection method which is executed in a portable telephone can be made into a program which can be executed in a computer. The program can be read from a computer-readable medium and executed by a general purpose digital computer. The recording medium includes a storage medium such as a flash memory which can be installed within a mobile terminal.

The recording medium, which is included in a mobile terminal, stores program codes which can be executed in a computer. The program codes are made to execute the steps of discriminating PCI, which is provided by the user for data protection, from a received short message; comparing user identifying information included in the PCI with information which is previously stored in the recording medium to correspond to the PCI; and processing data stored in the mobile terminal according to the user's data protection request type included in the PCI when the PCI is identical to the previously stored information.

Alternatively, a recording medium, which is included in a mobile terminal, stores program codes which can be executed in a computer. The program codes are made to execute the steps of discriminating PCI, which is provided by a user and a base station for data protection, from a received short message; comparing user identifying information and, if necessary, network identifying information, included in the PCI with information which is previously stored in the recording medium to correspond to the PCI; and processing data stored in the mobile terminal according to the user's data protection request included in the PCI when the PCI is identical to the previously stored information.

In relation to the latter embodiment of the embodiments of the present invention described above, a data protection method which is supported by a base station can be made into a program which can be executed in a computer. The program can be read from a computer-readable medium and executed by a general purpose digital computer. The recording medium includes a storage medium such as a magnetic storage medium (e.g., ROM, a floppy disk or a hard disk), an optical readable medium (e.g., CD-ROM or DVD) or carrier wave (e.g., transmission through the Internet).

The recording medium stores program codes which can be executed in a computer. The program codes are made to execute the steps of authenticating the identity of a user when the user requests data protection service; receiving PCI which is provided by the user for protecting data, which is stored in a lost mobile terminal, if the identity of the user is authenticated; adding PCI provided by a base station when necessary, if the PCI received from the user is encrypted text; and transmitting the PCI to the lost mobile terminal using SMS.

As described above, according to a data protection method which is installed in a lost mobile terminal and a recording medium for storing the method, operation is performed such that data stored in the lost mobile terminal is unreadable or removed using PCI, thereby preventing the data, which is stored in the lost mobile terminal, from being revealed to unintended persons.

What is claimed is:

1. A method for protecting data which is stored in a lost mobile terminal, the method comprising the steps of:
   (a) transmitting protection control information, which is provided by a user who has lost the lost mobile terminal, to the lost mobile terminal using a communication apparatus;
   (b) receiving the protection control information at the lost mobile terminal;
   (c) comparing user identifying information which is included in the protection control information with information which is previously stored in the lost mobile terminal; and
   (d) processing the data which is stored in the lost mobile terminal according to a data protection request of the user which is included in the protection control information, when the user identifying information is identical to the information previously stored in the lost mobile terminal,
   wherein the data protection request comprises at least one of an unreadable data request for altering the data stored in the lost mobile terminal into an unreadable form and a data removal request for removing the data which is stored in the lost mobile terminal.

2. The method of claim 1, wherein the step (a) comprises calling the lost mobile terminal for a short message service and transmitting the protection control information to the lost mobile terminal using the short message service, and the step (b) further comprises identifying at the lost mobile terminal the protection control information in a received short message.

3. The method of claim 1, wherein the step (b) further comprises determining whether the protection control information is encrypted text and decrypting the protection control information if it is determined that the protection control information is encrypted text.

4. The method of claim 1, wherein, in the step (c), the user identifying information included in the protection control information is a password which is entered by the user.

5. A method for protecting data which is stored in a lost mobile terminal, the method comprising the steps of:
   (a) requesting data protection service of a base station via a communication apparatus by a user who has lost the lost mobile terminal;
   (b) authenticating an identity of the user at the base station;
   (c) transmitting protection control information, which is provided by the user, via the base station to the lost mobile terminal if the identity of the user is authenticated;
   (d) receiving the protection control information at the lost mobile terminal;
   (e) comparing user identifying information which is included in the protection control information with information which is previously stored in the lost mobile terminal; and
   (f) processing the data which is stored in the lost mobile terminal according to a data protection request of the user which is included in the protection control information, when the user identifying information is identical to the information previously stored in the lost mobile terminal,
   wherein the data protection request comprises at least one of an unreadable data request for altering the data stored in the lost mobile terminal into an unreadable form and a data removal request for removing the data which is stored in the lost mobile terminal.

6. The method of claim 5, wherein the step (c) comprises the steps of:
   (c1) determining at the base station whether the protection control information provided by the user is encrypted text, if the identity of the user is authenticated; and
   (c2) adding additional protection control information, which is provided by the base station, to the protection control information which is provided by the user; and transmitting the protection control information and the additional protection control information to the lost mobile terminal, if the protection control information which is provided by the user is encrypted text, and transmitting the protection control information, if the protection control information which is provided by the user is not encrypted text.

7. The method of claim 5, wherein the step (c) comprises the steps of:
   (c1) determining at the base station whether the protection control information provided by the user is encrypted text, if the identity of the user is authenticated;
   (c2) adding additional protection control information, which is provided by the base station, to the protection control information which is provided by the user, if the protection control information which is provided by the user is encrypted text;
   (c3) calling the lost mobile terminal for short message service; and
   (c4) transmitting the protection control information and the additional protection control information from the base station to the lost mobile terminal using the short message service if the protection control information which is provided by the user is encrypted text, and transmitting the protection control information from the base station to the lost mobile terminal using the short message service if the protection control information which is provided by the user is not encrypted text, and
   the step (d) further comprises identifying the protection control information in a short message which is received by the lost mobile terminal.

8. The method of claim 5, wherein, in the step (e), the user identifying information which is included in the protection control information is a password which is entered by the user.

9. A recording medium for storing a data protection method, which is performed on data, which is stored in a lost mobile terminal, by the lost mobile terminal, in the form of program codes which can be executed in a computer, wherein the program codes are made to execute the steps of: discriminating protection control information, which is provided by a user for data protection, from a received short message; comparing user identifying information, which is included in the protection control information with information which is previously stored in the lost mobile terminal; and processing the data stored in the lost mobile terminal according to a user data protection request which is included in the protection control information when the protection control information is identical to the previously stored information, wherein the data protection request comprises at least one of an unreadable data request for altering the data stored in the lost mobile terminal into an unreadable form and a data removal request for removing the data which is stored in the lost mobile terminal.

10. The method of claim 9, wherein a message format of the protection control information comprises a protection control information identifier, an area for discriminating plain text from encrypted text, a protection service index which defines a type of the user data protection request, and the user identifying information which is compared with the information which is previously stored in the recording medium in the lost mobile terminal.

11. A recording medium for storing a data protection method, which is performed on data, which is stored in a lost mobile terminal, by the mobile terminal, in the form of program codes which can be executed in a computer, wherein the program codes are made to execute the steps: discriminating protection control information, which is provided by a user and a base station for data protection, from a received short message; comparing at least one user identifying information and network identifying information, which are included in the protection control information with information which is previously stored in the recording medium to correspond to the protection control information; and processing the data stored in the mobile terminal according to a data protection request of the user which is included in the protection control information when the protection control information is identical to the previously stored information, wherein the data protection request comprises at least one of an unreadable data request for altering the data stored in the lost mobile terminal into an unreadable form and a data removal request for removing the data which is stored in the lost mobile terminal.

12. The method of claim 11, wherein the message format of the protection control information comprises a protection control information identifier, an area for discriminating plain text from encrypted text, a protection service index which defines a type of the user data protection request, and the user identifying information which is to be compared with the information which is previously stored in the recording medium in the lost mobile terminal.

13. A recording medium for storing a data protection method, which is supported by a base station to be performed on data, which is stored in a lost mobile terminal, in the form of program codes which can be executed in a computer, wherein the program codes are made to execute the steps of: authenticating an identity of a user when the user requests data protection service; receiving protection control information which is provided by the user for protecting the data, which is stored in the lost mobile terminal, if the identity of the user is authenticated; adding additional protection control information provided by a base station, if the protection control information received from the user is encrypted text; and transmitting the protection control information and the additional protection control information to the lost mobile terminal using short message service.

14. The method of claim 1, wherein, in the step (c), the user identifying information included in the protection control information includes as least one of a user fingerprint and a user voice.

15. The method of claim 5, wherein, in the step (e), the user identifying information which is included in the protection control information includes at least one a user fingerprint and a user voice.

16. The method of claim 1, wherein a number of types of user identifying information used to authenticate the identity of the user varies between a plurality of predetermined security levels.

17. The method of claim 5, wherein a number of types of user identifying information used to authenticate the identity of the user varies between a plurality of predetermined security levels.

18. The method of claim 17, wherein at least one of the security levels requires the user to send a digital certificate to the base station, and wherein the digital certificate is used to authenticate the identity of the user.

* * * * *